(12) United States Patent
Golden et al.

(10) Patent No.: US 6,470,816 B1
(45) Date of Patent: Oct. 29, 2002

(54) WATERCRAFT LIFT ASSEMBLY

(76) Inventors: William Golden, 4810 Higginbotham Rd., Ft. Myers, FL (US) 33905; Michael Kremser, 5845 SE General Lee Terr., Stuart, FL (US) 34997

( * ) Notice: Subject to any disclaimer, the term of this patent is extended or adjusted under 35 U.S.C. 154(b) by 0 days.

(21) Appl. No.: 09/982,718

(22) Filed: Oct. 18, 2001

(51) Int. Cl.$^7$ .................................................. B63C 7/00
(52) U.S. Cl. ............................. 114/44; 114/48; 405/3
(58) Field of Search .............................. 114/44, 45, 48; 405/1, 2, 3, 4

(56) References Cited

U.S. PATENT DOCUMENTS

| | | | | |
|---|---|---|---|---|
| 4,686,920 A | * | 8/1987 | Thomas | 114/45 |
| 5,051,027 A | * | 9/1991 | Horton | 114/44 |
| 5,772,360 A | * | 6/1998 | Wood, II | 114/48 |
| 5,915,877 A | | 6/1999 | Sargent et al. | |
| 5,988,941 A | * | 11/1999 | Sargent et al. | 114/48 |
| 6,174,106 B1 | | 1/2001 | Bishop et al. | |
| 6,230,639 B1 | | 5/2001 | McLaughlin et al. | |

OTHER PUBLICATIONS

"Elevator Lifts–The Most Advanced Boat Lifts in the World!" brochure.
"Flat Plate Lifts–The Most Advanced Boat Lifts in the World!" brochure.

* cited by examiner

Primary Examiner—Stephen Avila
(74) Attorney, Agent, or Firm—Laura G. Barrow

(57) ABSTRACT

The present invention is directed to novel watercraft lift assemblies comprising, in certain embodiments, single motor and dual motor/winch assemblies secured to the dock-side portion of the support structure. The present invention does not require the use of top frames for carrying cable shafts necessary to lift the frame supporting the watercraft.

7 Claims, 11 Drawing Sheets

WATERCRAFT LIFT ASSEMBLY

BACKGROUND AND SUMMARY OF THE INVENTION

The present invention is directed to novel watercraft lift assemblies comprising, in certain embodiments, single motor and dual motor/winch assemblies secured to the dock-side portion of the support structure. The present invention does not require the use of top frames for carrying cable shafts necessary to lift the frame supporting the watercraft.

DETAILED DESCRIPTION OF THE PREFERRED EMBODIMENTS

Referring now to the figures, the present invention comprises three different embodiments for the inventive watercraft lift assembly. The term "watercraft," as used herein, refers to any vehicle designed for operation on any waterway and includes, but is not limited to, outboard motor boats, jet skis, inboard motor boats, pontoon boats, sailboats, jet boats, and the like. In addition, "waterway" includes any lake, river, ocean, gulf, and the like wherein a dock may be typically installed.

Figure 1:
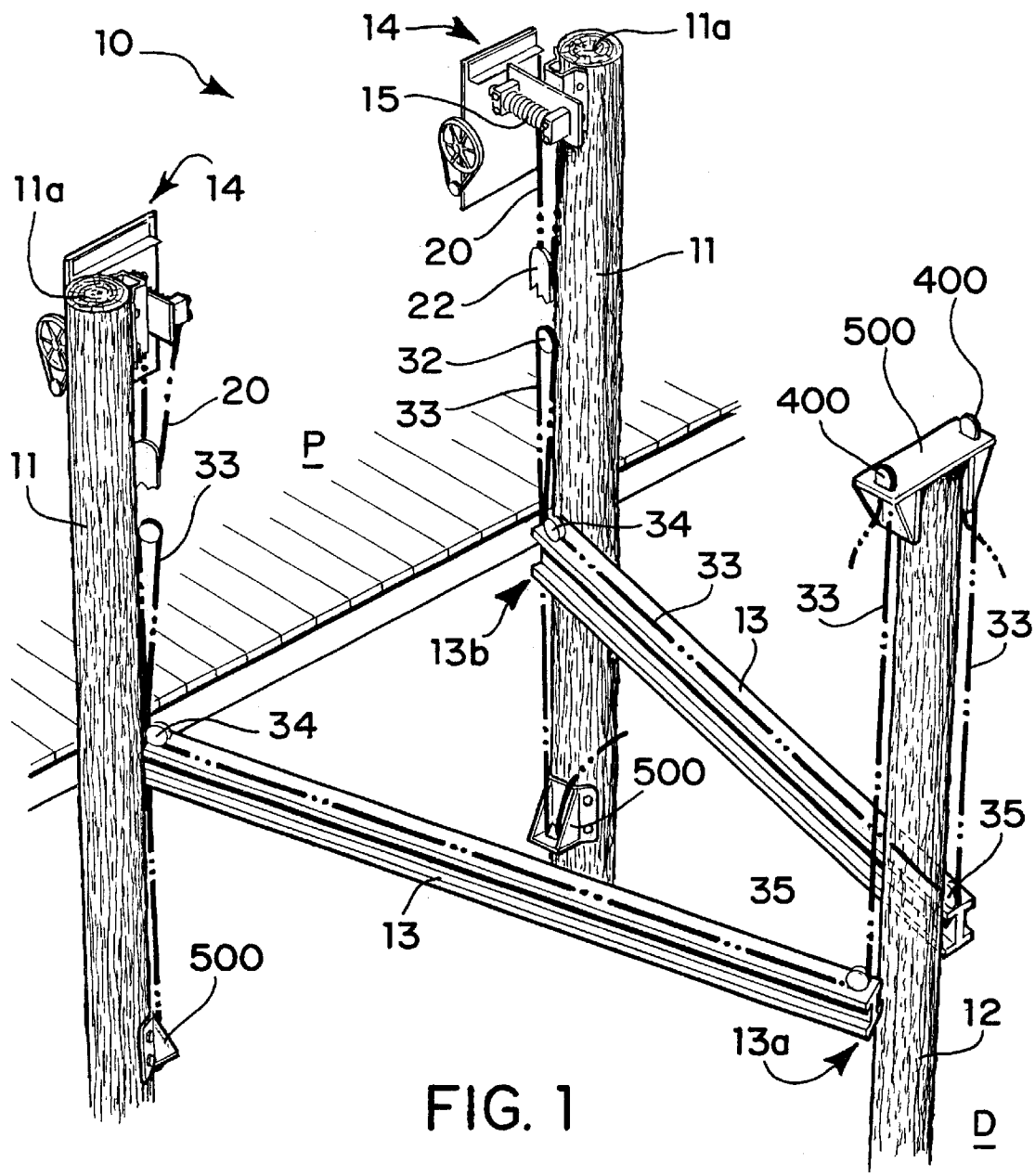
FIG. 1 is a perspective view of one embodiment of the present invention.

FIG. 1 illustrates the first embodiment of the invention which, for ease explanation, is referred herein as the "three-post/dual motor embodiment." This embodiment comprises a support structure to which the motor/winch assemblies and terminal ends of the lifting cables are mounted or secured, respectively. Specifically, the support structure of the three-post/dual motor design illustrated in FIG. 1 comprises two vertical pilings 11 positioned on the proximal side P (i.e. dock side) of the watercraft (not shown). The vertical pilings are typically spaced about 7 feet to 12 feet from one another. A third vertical piling 12 is positioned on the distal side D of the watercraft (i.e. a distance away from the dock). As shown in FIG. 1, elongated transverse lifting beams 13 are positioned between the pilings by a pair of pulley assemblies and cables.

Figure 2:
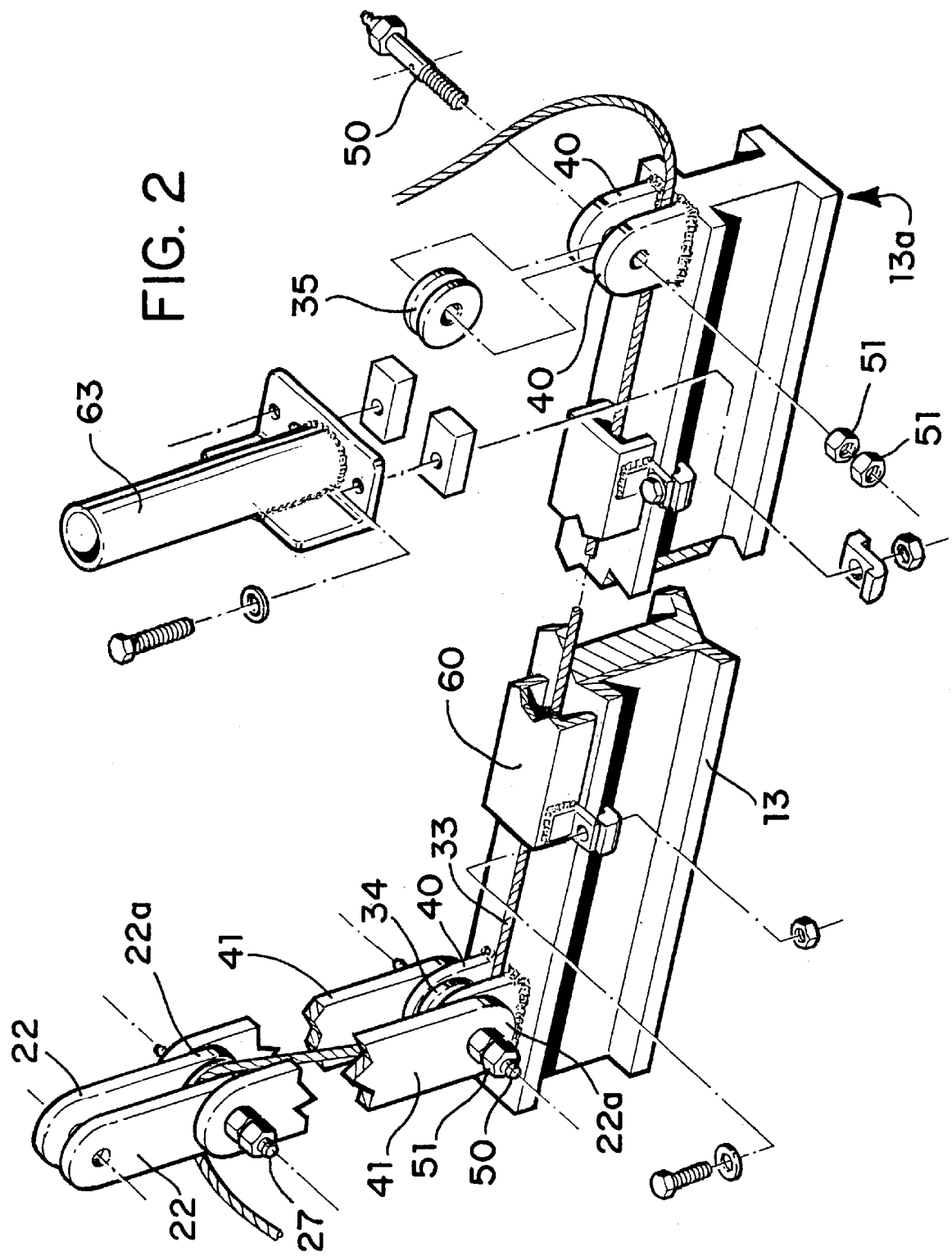
FIG. 2 is a detailed, partially exploded view of the second pulley assembly connected to one of the transverse beams of the lifting frame.
Figure 3:
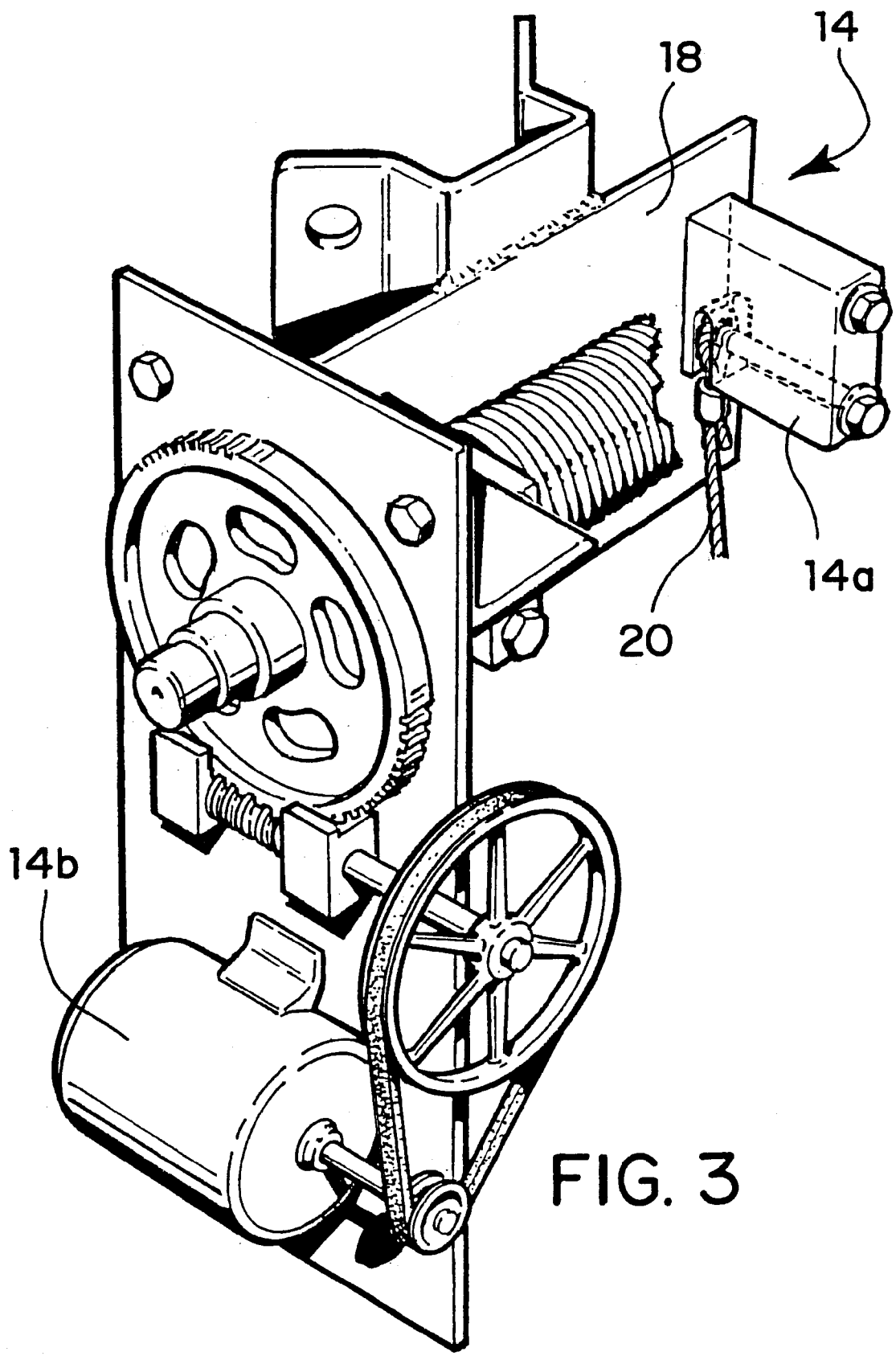
FIG. 3 is a perspective view of a motor/winch assembly illustrating an exemplary tie off of the first cable.
Figure 6:
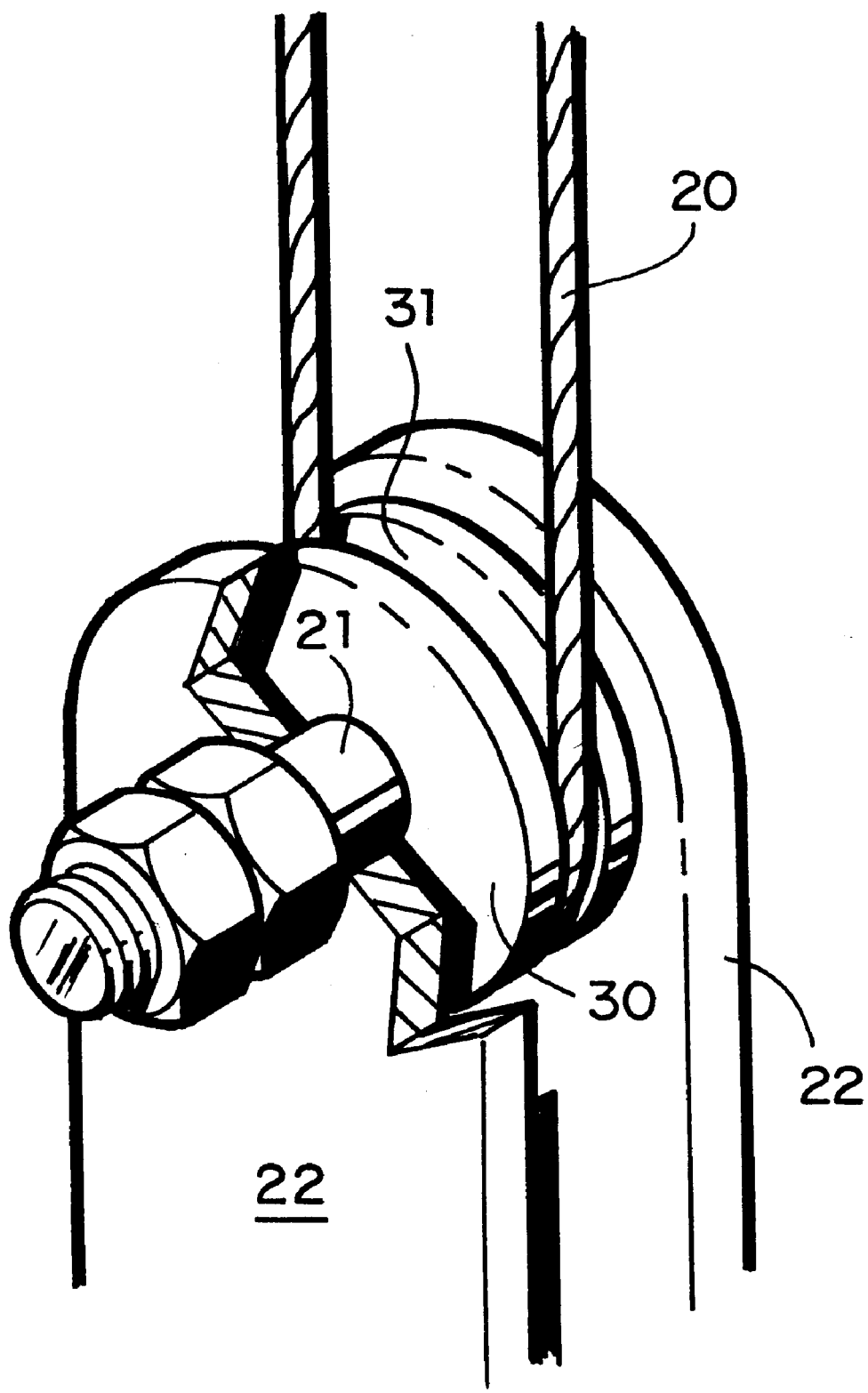
FIG. 6 is a perspective view of the first pulley in combination with the first cable in the first and third embodiments of the present invention.

The embodiment illustrated in FIG. 1 comprises a pair of motor/winch assemblies 14, each of which is secured separately to one of the proximal pilings 11. Each winch assembly 14 contains a rotatable spool 15 about which a length of lifting cable 20 is wound. In one embodiment, the spool is secured to a bracket piece 18 which in turn is secured to the motor assembly 17. One end of the cable is secured to the spool while the other end is tied off near the top end 11a of the piling (not shown) or to the winch assembly, as shown in FIGS. 1 and 3. The cables may be stainless steel aircraft cable, nylon, or other types of cables or ropes known by those of ordinary skill in the art. The lifting cable 20 is further mounted onto a pulley wheel 30, as shown in FIGS. 1 and 6. Preferably, about 12 feet to about 24 feet of cable are employed on this portion of the pulley assembly. The first pulley wheel 20 is mounted onto a bolt 21 which, in turn, is used to secure a pair of parallel pulley housing plates 22 to one another. The first pulley wheel 31 is clearly illustrated in FIG. 6, but is hidden from view by one of the parallel plates 22 in the remaining figures. In addition, only a small portion of parallel plates 22 are shown in FIG. 1; however, the plates are more clearly shown in FIGS. 2 and 6. When the motor 14b is actuated to operate the winch 14, the spool rotates to release or wind the lifting cable 20 along the pulley wheel 30. It will be understood by those of ordinary skill in the art that all of the pulley wheels employed in all of the embodiments of the present invention are conventional pulley wheels, each having a sufficiently wide groove 31 for maintaining the lifting cables as they move thereon (see FIG. 6, for example).

Also secured between the parallel plates 22 is a second pulley wheel 32 positioned subjacent to the first pulley wheel 30. The second pulley wheel 32 is mounted to a second bolt 27 that also serves to secure the parallel plates 22 to one another, as shown in FIGS. 1 and 2. A second cable 33 is employed, wherein one end is secured to one of the vertical pilings 11 below the transverse lifting beams 13 (at 500, for example) and the other end is secured near the top end 12a of the third vertical piling (at 500, for example) as shown in FIG. 1. The remaining length of cable is aligned, in succession, over the second pulley wheel 32, beneath a third pulley wheel 34, along the top surface of the transverse beam, and beneath a fourth pulley wheel 35 mounted to the distal end 13a of the transverse beam, as shown in FIGS. 1 and 2. A preferred length of this second cable is 26 feet to 36 feet, although the skilled artisan, will recognize that the length may be varied depending upon the size of the watercraft. Moreover, the third and fourth pulley wheels 34,35 are preferably mounted onto brackets 40 that are integral with opposing ends of the transverse beams 13. Preferably, the latter pulley wheels 34, 35 are mounted within brackets 40 using hollow bolts 50 with zerk fittings.

When the motor/winch assembly in this embodiment is actuated via a single switch (not shown) to lift the transverse lifting beams 13, the cable 20 pulls the plates 22 upward, thereby synchronistically raising the beams upward. Lowering the transverse beams operates in the same fashion.

FIG. 2 more clearly illustrates the pulley and cable components of the inventive lifting apparatus. Not shown in FIG. 1 but shown in FIG. 2 are a second pair of parallel plates 41. The lower ends 22a of the first pair of parallel plates 22 are secured via a bolt 27, as shown. The second pair of plates 41 provide for more stability during operation of the lift assembly. In addition, the lift assembly preferably includes a cable tunnel 60 configured to protect the second cable 33 from damage. A vertical stabilizing member 63 may also be secured to each of the transverse beams to minimize side-to-side movement of the boat hull. These features of the present invention are preferably present in all of the inventive embodiments illustrated and described herein.

Figure 4:
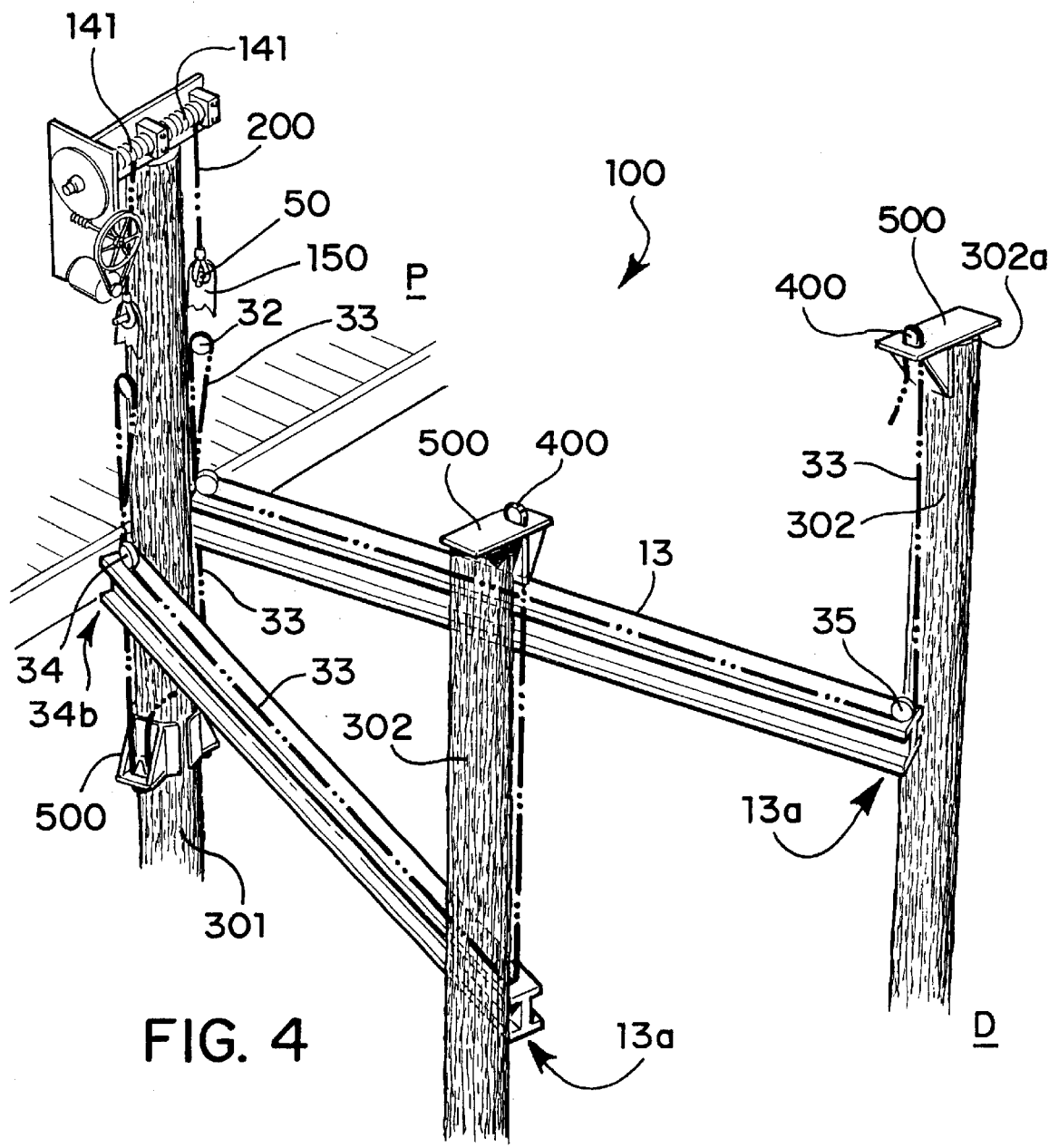
FIG. 4 is a perspective view of a second embodiment of the present invention.

FIG. 4 illustrates a second embodiment of the inventive lifting apparatus which, for ease of explanation, is referred to herein as the "three-post,/single motor design" 300. In this embodiment, three vertical pilings 301 used for structural support are employed. Specifically, the three-post/single motor embodiment illustrated in FIG. 4 comprises one vertical piling positioned on the dock-side or proximal side P of the water craft (not shown). Two other vertical pilings 302 are positioned a distance away from the dock, for example, and more particularly on the distal side D of the dock. These vertical pilings are typically spaced about 7 feet to 12 feet from one another. In this embodiment, the transverse lifting beams for carrying the watercraft are positioned between the pilings as shown in FIG. 4.

Figure 7:
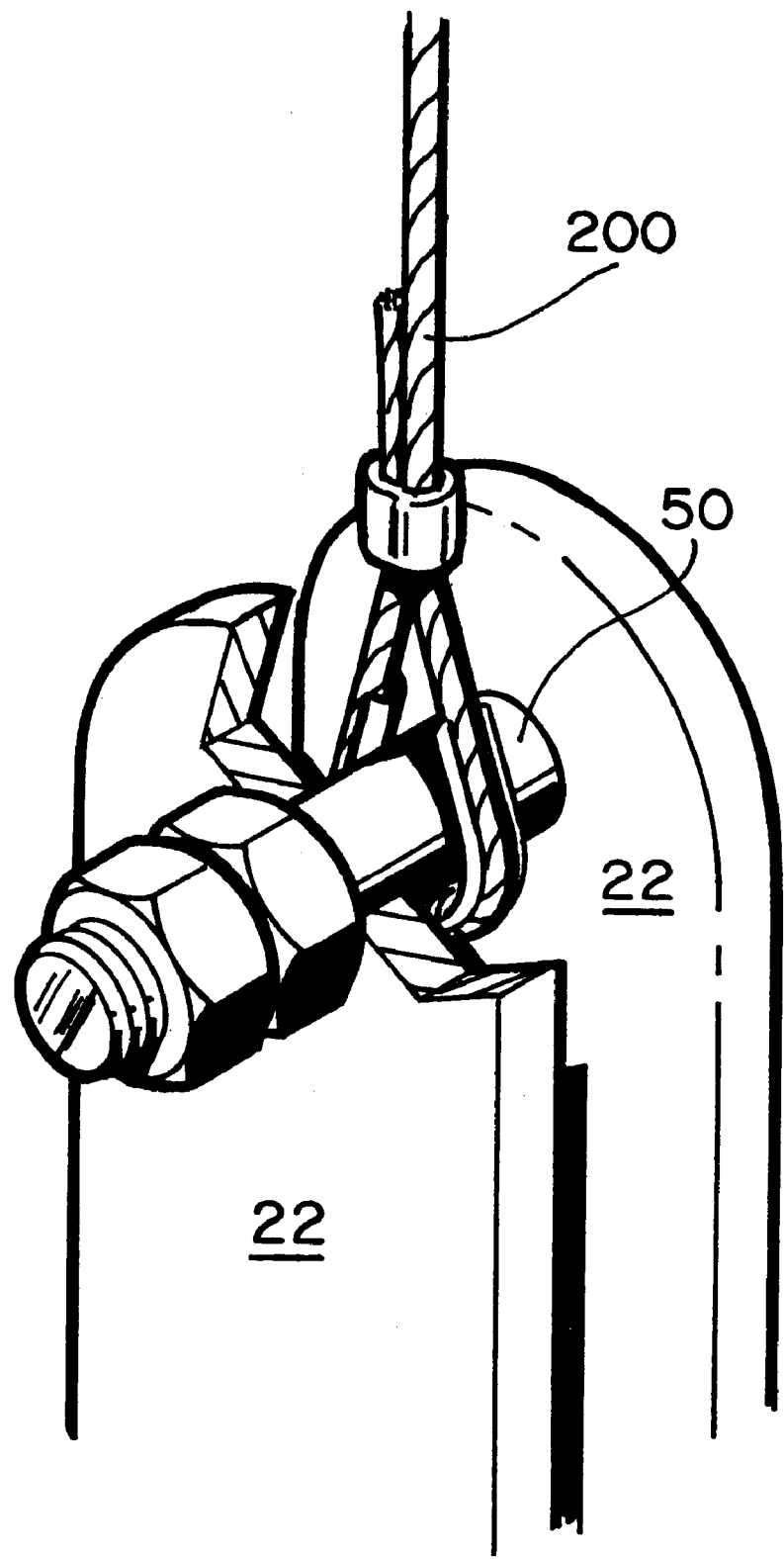
FIG. 7 is a perspective view of the cable tie-off in combination with the first cable in the second embodiment of the present invention.

A winch assembly 14 is mounted near the top end of the first vertical piling 301. The winch assembly includes a pair of rotatable spools 141 and a motor 14b for turning the spools. A first cable 200 is wound about each of the spools 141, with one end of the cable secured to the spool and the other end secured to a bolt 50 connecting the two parallel pulley plates 22, as shown in FIGS. 4 and 7. Preferably, these cables are from about 12 feet to about 24 feet in length, depending upon the size of the watercraft intended to be lifted.

The three-post/single motor design 100 of the present invention further includes a pair of pulley assemblies, each of the pulley assemblies positioned on one side of the proximal vertical piling 301 as well as one of the transverse lifting beams 13. More specifically, each of the pulley assemblies includes a pulley wheel 32 secured to the parallel plates by a bolt 50 connecting the two plates, as shown in FIG. 4. The pulley wheel 32 is positioned subjacent to the upper bolt 50 connecting the parallel plates 22. Each of the pulley assemblies further includes a second pulley wheel 34 positioned subjacent to the first pulley wheel 32 and mounted onto another bolt 50. A third pulley wheel 35 is positioned on each of the transverse beams 13 near the distal vertical piling 302 and held therein by a bolt 50, as shown in FIG. 2. Preferably, the pulley wheels 34,35 positioned on the transverse lifting beams 13 are mounted within brackets 40 using hollow bolts with zerk fittings 52, as described above for the first embodiment and illustrated in FIG. 2.

The three post/single motor embodiment 100 of the present invention further includes a set of second cables 33, with each cable having one end fixedly secured to one side of the proximal vertical piling 301 below the first end 13b of the transverse beam and the second end fixedly secured to and near the top end 302a of one of the distal side vertical pilings 302, as shown in FIG. 4. The remaining portion of each of the second cables is aligned, in succession, over the first pulley wheel 32, beneath the second pulley wheel 34, along the top surface of the transverse beam, and beneath the third pulley wheel 35 on the distal end 13a of the transverse beam. As shown in FIG. 2, the second and third pulley wheels 35,36 are mounted within brackets 40 using hollow bolts with zerk fittings 51. Preferably, from about 26 feet to about 36 feet of cable 30 are used, depending upon the size of the watercraft intended to be lifted by the inventive lifting assembly.

When the motor/winch assembly in this embodiment is actuated via a single switch (not shown) to lift the transverse lifting beams 13, the cable 200 pulls the plates upward, thereby synchronistically raising the transverse lifting beams 13. Lowering the transverse beams operates in the same fashion.

Figure 5:
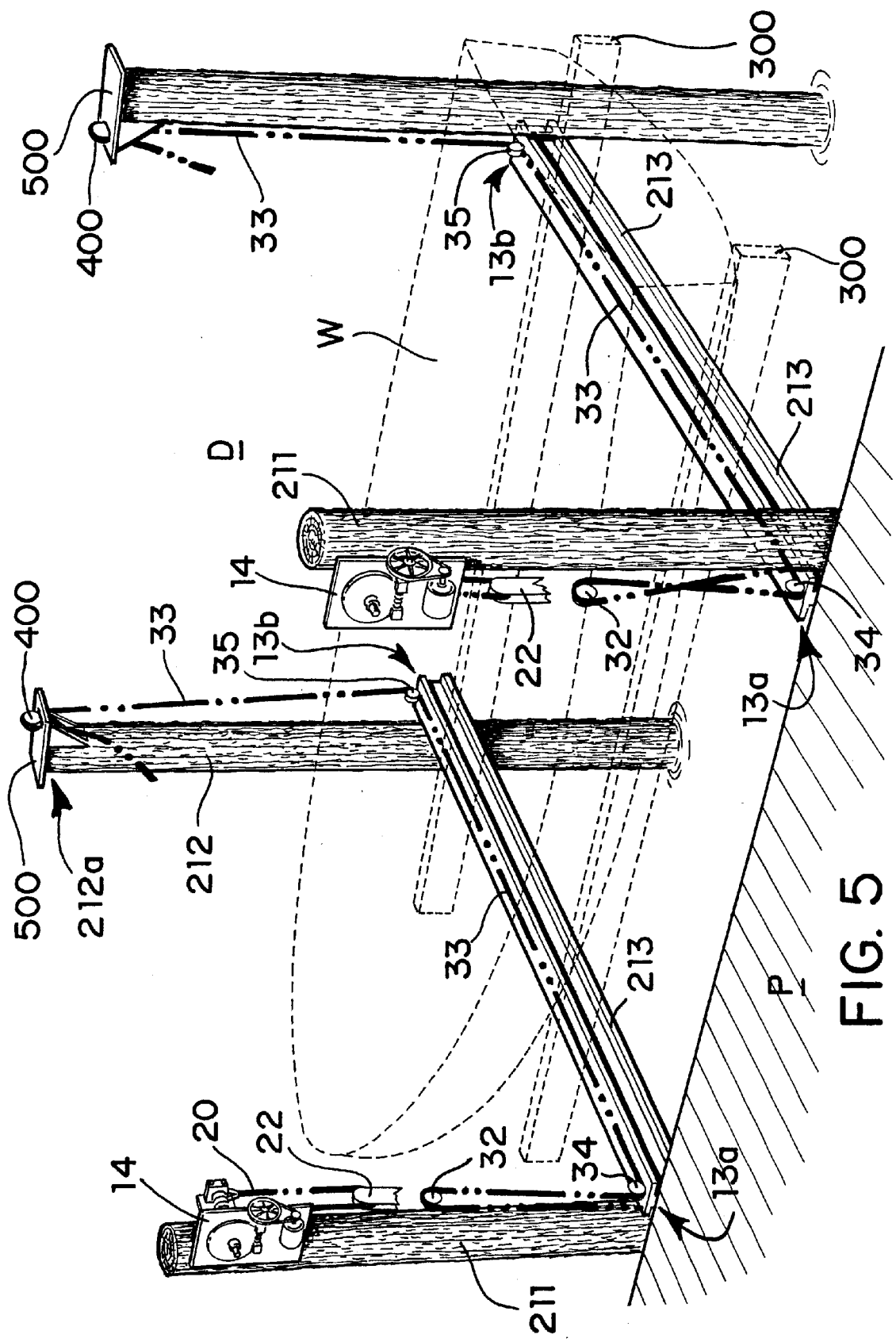
FIG. 5 is a perspective view of a third embodiment of the present invention.
Figure 10A:
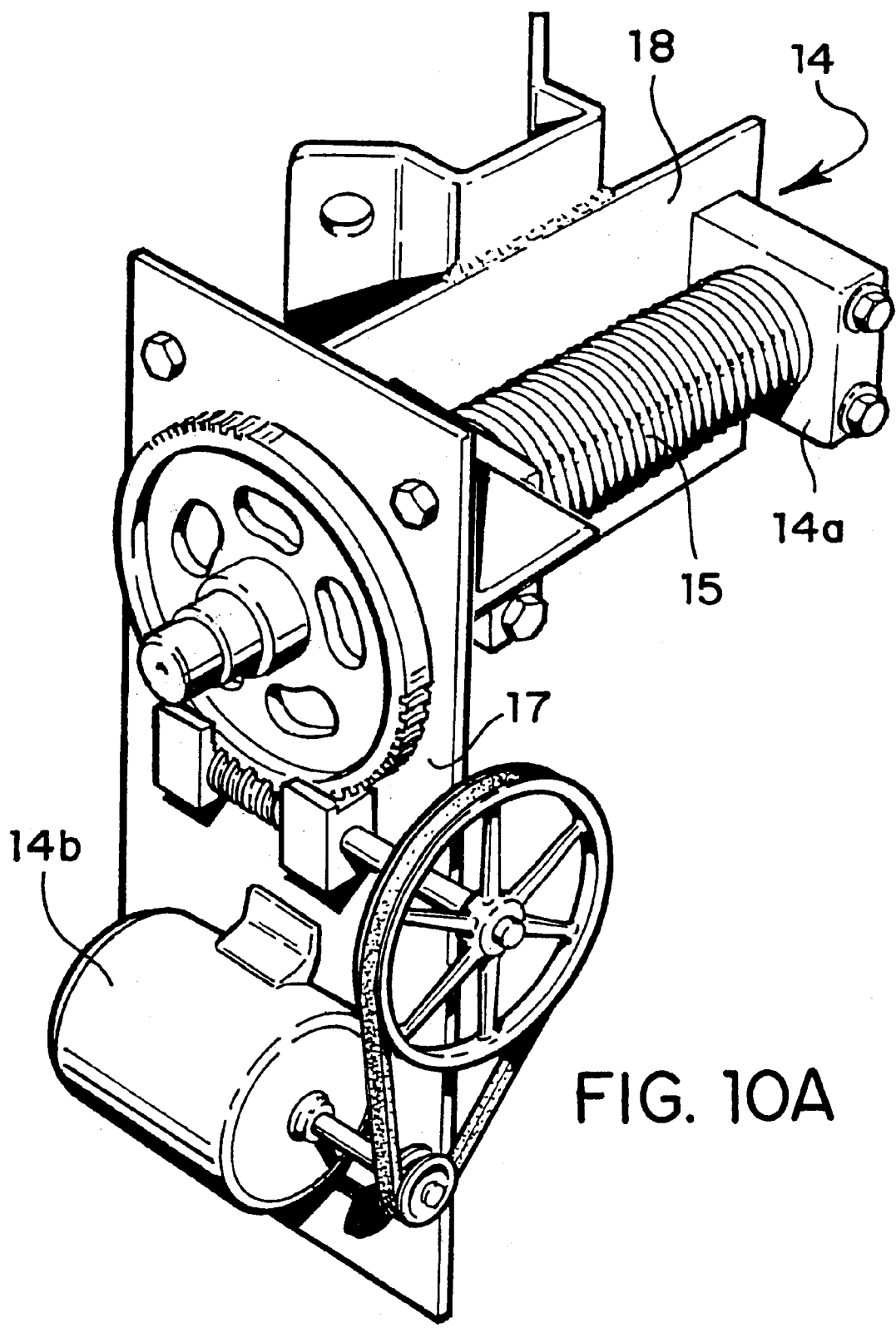
FIG. 10A is a perspective view of the motor/winch assembly of the present invention.
Figure 10B:
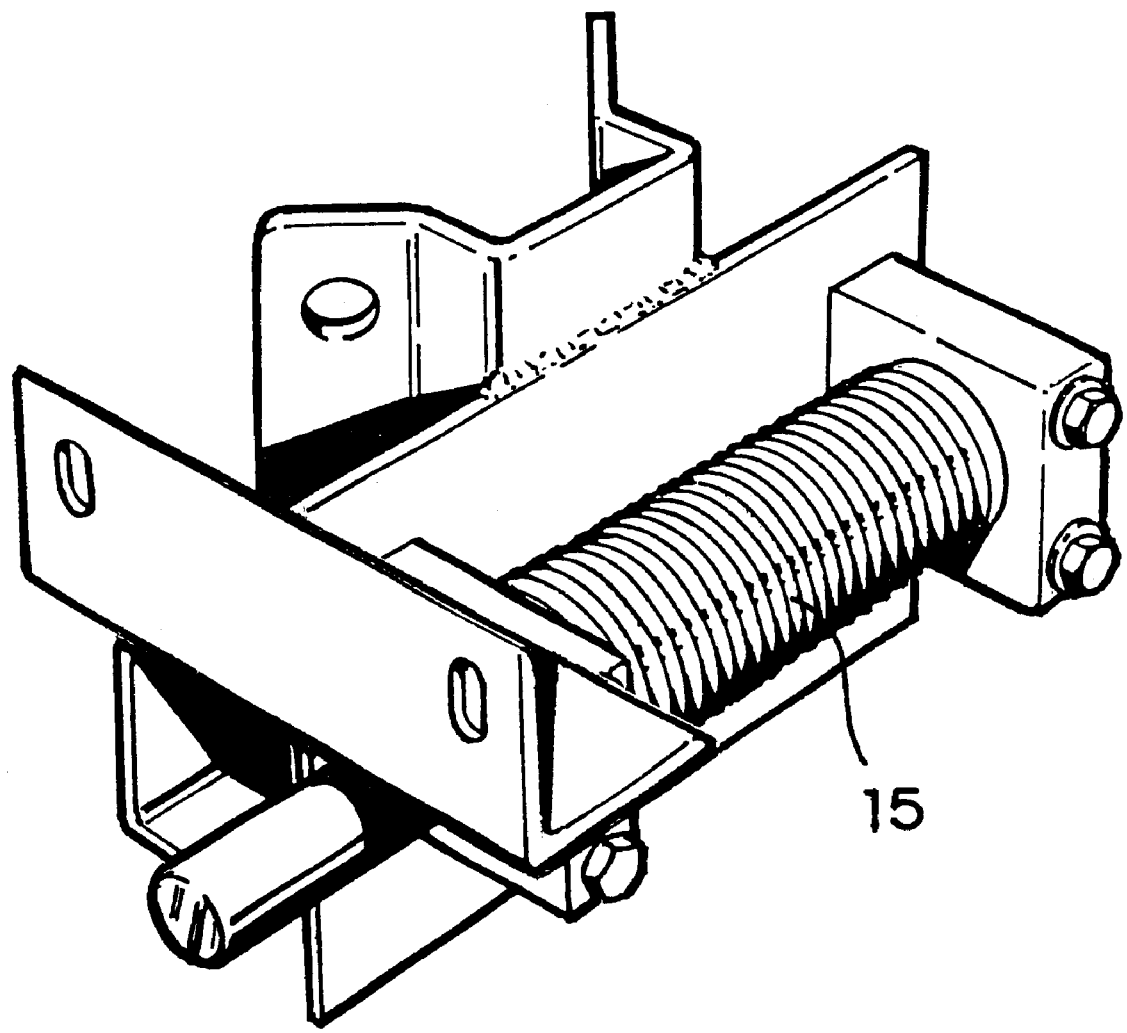
FIG. 10B is a perspective view of the spool bracket portion of the motor/winch assembly used in the present invention.

FIG. 5 illustrates a third embodiment of the present invention. In this embodiment, which for ease of explanation is referred to herein as the "four post/dual motor" embodiment 200, the support structure of the assembly includes a first pair of vertical pilings 211 positioned on the proximal side P (i.e. dock side) of the watercraft W and a second pair of vertical pilings 212 positioned on the distal side D of the watercraft W. This embodiment further includes a pair of transverse lifting beams 13, which in combination with the other features of the invention, may be lowered or raised to accommodate a watercraft. Each of the two lifting beams 13 is positioned between adjacent distal and proximal pilings 211,212, as shown in FIG. 5. This embodiment includes a pair of winch/motor assemblies 14, each of which is secured to one of the proximal pilings 212 near the top end 213a at 500, as shown. Each of the winch/motor assemblies 14 includes a spool about which a cable 20 is wound. This first cable 20 is wound about each of the spools 15 (see FIG. 10A), with the cable having one end fixedly secured to the spool and a second end fixedly secured to either piling of the first pair of vertical pilings 211 or a portion of the winch assembly on each of the first pair of proximal pilings 211. The first cable 20 is mounted onto the first pulley wheel 34, as also described above and illustrated for the first embodiment (i.e. see FIGS. 5–6), and serves to raise or lower the pulley wheel 30 via the motor/winch assembly 14. The first pulley A second pulley wheel 34 is housed between a second pair of parallel housing plates 41 and subjacent to the first pulley wheel. Preferably, the second pulley wheel 34 is rotatably mounted on a bolt 50 securing the two parallel plates 41 together. This cable 20 is movably mounted on the first pulley wheel 30 for longitudinal movement upon activation of the motor.

Each of the pulley assemblies further includes a third pulley wheel 34 positioned subjacent to the second pulley wheel 32 on the proximal end 13a of the lifting beam as well as a fourth pulley wheel 35 positioned on the distal end 13b of the lifting beam 13. The third pulley wheel 34 is further rotatably mounted on a bolt 50 secured between the brackets.

The pulley assembly further includes a set of second cables 33, each having a first end secured to one side of the proximal vertical piling 211 beneath the transverse beam and a second end secured to and near the top of one of the two distal pilings to which it is adjacent. The second cable 33 is further aligned, in succession, over the second pulley wheel 32, beneath a beneath the third pulley wheel 34, along the top surface of the beam, and beneath a fourth pulley wheel 35, wherein the fourth pulley wheel is mounted to the distal end of each of the elongated beams. Preferably, the third and fourth pulley wheels 34,35 positioned on the lifting beams are mounted within brackets 41 using hollow bolts with zerk fittings 51, as described above for the first and second embodiments illustrated herein.

To operate the lifting apparatus, two switches actuated to activate the motor and winches of the motor/winch assembly, thereby causing the first cable 20 to raise or lower the two lifting beams, synchronistically.

Figure 9:
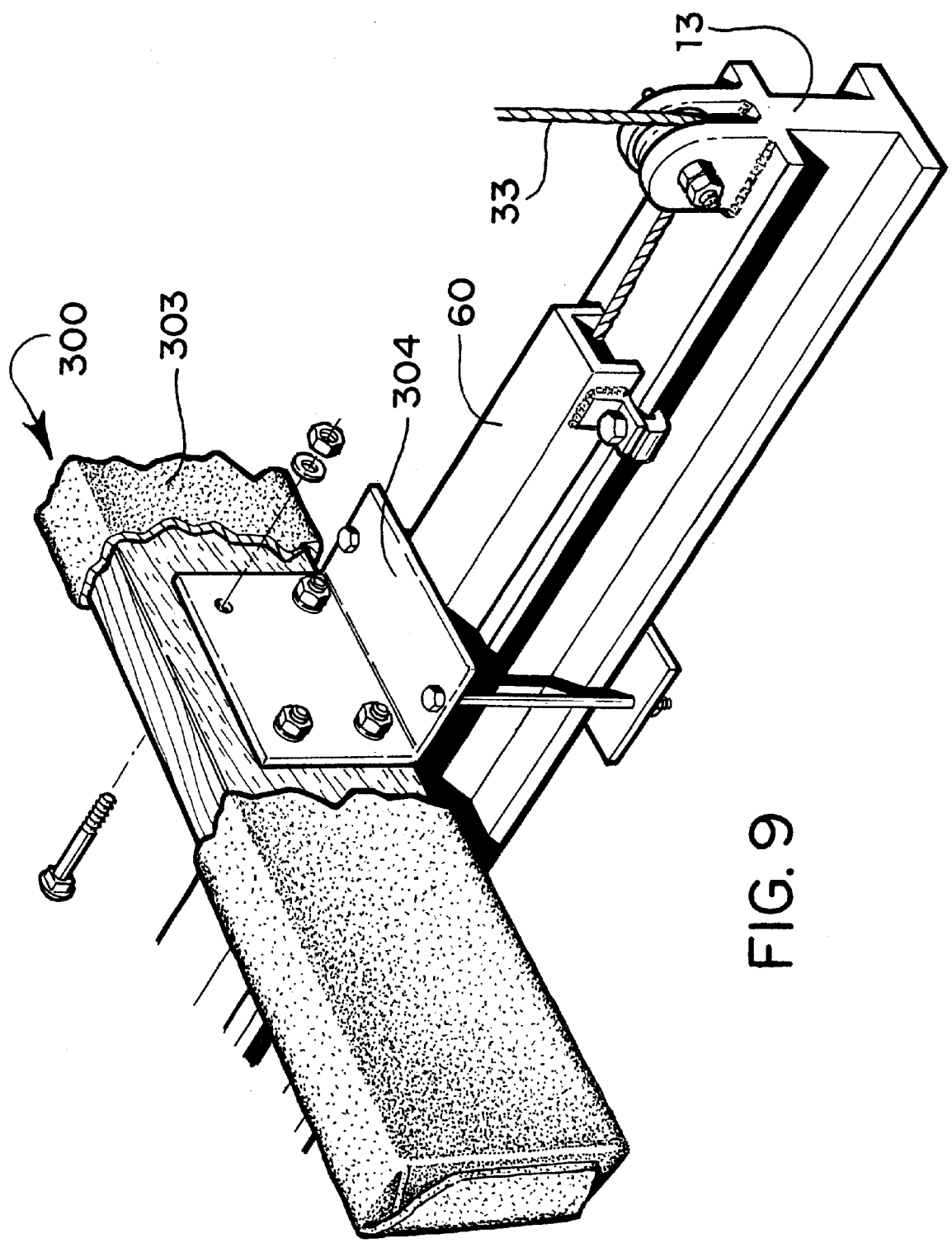
FIG. 9 is a enlarged view showing a portion of one of the transverse beams with a portion of the support frame secured thereon.

FIG. 5 illustrates a boat hull W (in phantom) positioned on the transverse lifting beams 13. Preferably, the lifting beams are further connected to one another by a pair of cross beams 300 positioned on the top surface of the lifting beams 13. Preferably, these cross beams 300 are covered with an artificial turf 301 or other suitable material to prevent slippage and scratching of the watercraft hull or bottom. As shown in FIG. 9, the cross beams may be secured to the transverse beams via an L-bracket 302, for example.

Figure 8:
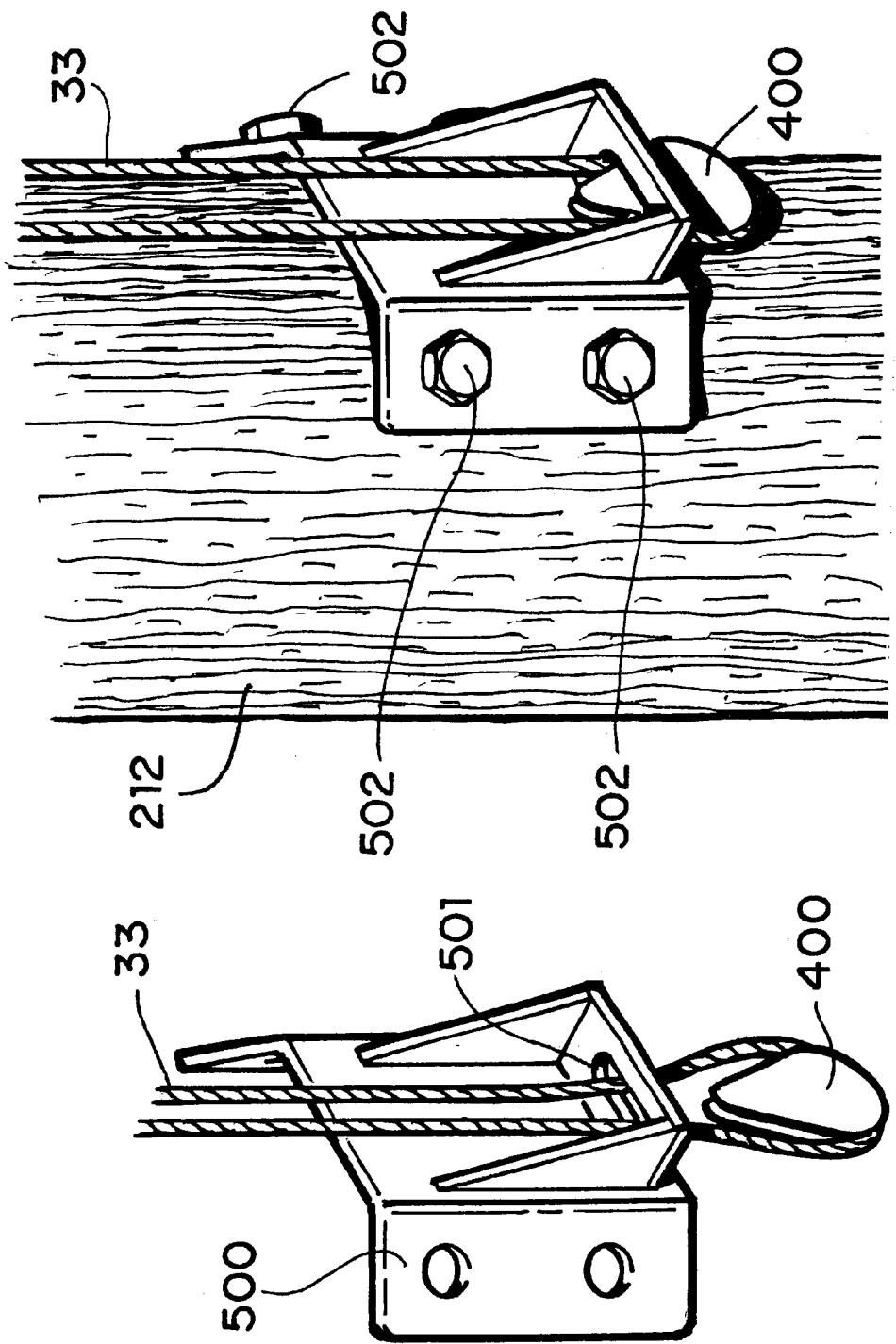
FIGS. 8A and 8B are enlarged views of the preferred cable terminal end tie offs in the present invention.

The present invention is also directed to a novel device for safely securing the free end of the lifting cable 33 to the vertical piling. As shown in FIGS. 8A–8B, the cable 33 is aligned within a grooved wedge 400. The wedge 400 is configured to fit within the slot 508 of a becket which has been bolted onto the vertical piling. FIG. 8B illustrates an L-shaped becket 500 secured to a vertical piling via bolts 502. The upward force of the cable during operation of the lifting apparatus causes the wedge/cable combination to lock into the slot 50 within the becket, thereby minimizing any slippage of the cable during operation.

The foregoing disclosure and description of the invention are illustrative and explanatory thereof, and various changes in the size, shape, and materials, as well as in the details of the illustrated construction, may be made without departing from the spirit of the invention.

In the claims:

1. A watercraft lift assembly for selectively lifting a water craft into and out of a waterway, said assembly comprising:
   a. a support structure installed within said water way, said support structure comprising first and second vertical pilings positioned on a proximal side of said watercraft and a third vertical piling positioned on a distal side of said watercraft;
   b. a first transverse beam mounted between said first and third pilings and a second transverse beam mounted between said second third pilings, said beams configured for carrying said watercraft;
   c. two winch assemblies, wherein each of said winch assemblies is attached to one of said first and second pilings, each of said winch assemblies further including a rotatable spool and a motor for turning said spool;
   d. a first cable wound about said spool, said cable having one end fixedly secured to said spool and a second end fixedly secured to either said piling or a portion of said winch assembly;
   e. a pulley assembly secured to said support structure and one of said beams, said pulley assembly including a first pulley wheel housed between two parallel plates and rotatably mounted onto a first bolt connecting said parallel plates, and wherein said first cable is movably mounted on said first pulley wheel for longitudinal movement upon activation of said motor;
   f. said pulley assembly further including a second pulley wheel housed between said two parallel plates and rotatably mounted onto a second bolt connecting said parallel plates, said second pulley wheel positioned subjacent to said first pulley wheel,
   g. said pulley assembly further including a third pulley wheel positioned subjacent to said second pulley wheel and mounted within a bracket by a third bolt, wherein said bracket is further secured to a first end of said beam;
   h. a second cable having a first end fixedly secured to one of said first and second pilings below said first end of said beam, and a second end fixedly secured onto and near a top end of said third piling, and wherein said second cable is further aligned, in succession, over said second pulley wheel, beneath said third pulley wheel, along a top surface of said beam, and beneath a fourth pulley wheel, said fourth pulley wheel mounted within a bracket by a bolt, wherein said bracket is further secured to a second end of one of said elongated beams;

whereby when said motor is selectively actuated to raise or lower a water craft carried on said elongated beams, said winches on each of said first and second pilings are activated to synchronistically wind said first cable about said spool, thereby moving said first and second pulleys longitudinally along said second cable.

2. The lift assembly of claim 1, wherein each of said transverse beams includes a tunnel housing for enclosing a portion of said second cable.

3. A watercraft lift assembly for selectively lifting a water craft into and out of a waterway, said assembly comprising:
   a. a support structure installed within said water way, said support structure comprising a first vertical piling positioned on a proximal side of said watercraft and second and third vertical pilings positioned on a distal side of said watercraft;
   b. a first transverse beam mounted between said first and second pilings and a second transverse beam mounted between said first and third pilings, said beams configured for carrying said watercraft;
   c. a winch assembly mounted onto a top end of said first piling, said winch assembly further including a pair of rotatable spools and a motor for turning said spools;
   d. a pair of first cables, wherein each of said first cables is wound about one of said spools and has one end fixedly secured to said spool and a second end fixedly secured to a first bolt connecting a pair of parallel plates;
   e. a pair of pulley assemblies secured to said first piling and said transverse beams, wherein said pulley assemblies further includes a first pulley wheel housed between said two parallel plates, said first pulley wheel subjacent to said first bolt and rotatably mounted onto a second bolt, said second bolt further secured to a lower end of said parallel plates;
   f. said pulley assembly further including a second pulley wheel positioned subjacent to said first pulley wheel and mounted within a bracket by a third bolt, wherein said bracket is further secured to a first end of said beam; and
   g. a set of second cables, each having a first end fixedly secured to one side of said first piling below said first end of said beam, and a second end fixedly secured onto and near a top end of one of said second or third piling, and wherein said second cable is further aligned, in succession, over said first pulley wheel, beneath said second pulley wheel, along a top surface of said beam, and beneath a third pulley wheel, wherein said third pulley wheel is mounted within a bracket by a bolt, said bracket further secured to a second end of one of said elongated beams;

whereby when said motor is selectively actuated to raise or lower a water craft carried on said elongated beams, said pair of spools on each side of said first piling are activated to synchronistically wind said first cable about said spool, thereby moving said first bolt and second pulley longitudinally along said second cable to move said beam.

4. The lift assembly of claim 3, wherein each of said transverse beams includes a tunnel housing for enclosing a portion of said second cable.

5. A watercraft lift assembly for selectively lifting a water craft into and out of a waterway, said assembly comprising:

a. a support structure installed within said water way, said support structure comprising a first pair of vertical pilings positioned on a proximal side of said watercraft and a second pair vertical pilings positioned on a distal side of said watercraft;

b. a pair of transverse beams, one of said pair of beams mounted between adjacent proximal and distal pilings; said beams configured for carrying said watercraft as said watercraft is selectively lifted into and out of said waterway by said watercraft lift assembly;

c. a pair of winch assemblies, each of said winch assemblies mounted onto a top end of one of said pair of first pilings, each of said winch assemblies further including a rotatable spool and a motor for turning said spool;

d. a first cable wound about each of said spools, said first cable having one end fixedly secured to said spool and a second end fixedly secured to a portion of said winch assembly on each of said first pair of pilings;

e. a pulley assembly secured to said support structure and each of said beams, said pulley assembly including a first pulley wheel housed between two parallel plates and rotatably mounted onto a first bolt connecting said parallel plates, and wherein said first cable is movably mounted on said first pulley wheel for longitudinal movement upon activation of said motor;

f. said pulley assembly further including a second pulley wheel housed between said two parallel plates and rotatably mounted onto a second bolt connecting said parallel plates, said second pulley wheel positioned subjacent to said first pulley wheel;

g. said pulley assembly further including a third pulley wheel positioned subjacent to said second pulley wheel and mounted onto a third bolt, said third pulley wheel and third bolt, in combination, further mounted to a first end of said beam;

h. a second cable having a first end fixedly secured to one of said first pair of pilings below said first end of said beam, and a second end fixedly secured onto and near a top end of one of said second pair of pilings, and wherein said second cable is further aligned over said second pulley wheel, beneath said third pulley wheel, along a top surface of said beam, and beneath a fourth pulley wheel, said fourth pulley wheel mounted to a second end of one of said elongated beams;

whereby when said motors are selectively actuated to raise or lower a water craft carried on said elongated beams, said winches on said first pair of pilings are activated to synchronistically wind said first cable about said spool, thereby moving said second and third pulleys longitudinally along said second cables.

6. The lift assembly of claim 5, wherein each of said transverse beams includes a tunnel housing for enclosing a portion of said second cable.

7. A watercraft lift assembly for selectively lifting a water craft into and out of a waterway, said assembly comprising:

a. a support structure installed within said water way, said support structure comprising at least one vertical piling positioned on a proximal side of said watercraft and at least one vertical piling positioned on a distal side of said watercraft;

b. at least two transverse beams mounted between said vertical pilings, said beams configured for carrying said watercraft;

c. a pulley assembly secured to said support structure and transverse beams, said pulley assembly including a set of lifting cables mounted thereon for selectively lifting said water craft into and out of said waterway, each of said set of cables having a free cable end for mounting to one of said pilings;

d. a motor/winch assembly secured to said assembly for activating said pulley assembly; and e. a cable tie-off device for securing said free cable end to said vertical piling, said cable tie-off device including (i) a becket fastened to said piling, said becket having a slot, and (ii) a wedge portion configured to fit within said slot of said becket, said wedge portion further having a grooved periphery for maintaining a portion of said free cable end, such that when said wedge in combination with said portion of said free cable end are inserted within said slot, any force pulling said wedge further within said slot locks said wedge therein, thereby preventing slippage of said free cable end therein.

* * * * *